(12) United States Patent
Hoheisel et al.

(10) Patent No.: US 7,149,283 B2
(45) Date of Patent: Dec. 12, 2006

(54) METHOD FOR PRODUCING AND APPLYING AN ANTISCATTER GRID OR COLLIMATOR TO AN X-RAY OR GAMMA DETECTOR

(75) Inventors: Martin Hoheisel, Erlangen (DE); Martin Schaefer, Berlin (DE); Hartmut Sklebitz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 6 days.

(21) Appl. No.: 10/655,025

(22) Filed: Sep. 5, 2003

(65) Prior Publication Data

US 2004/0131158 A1 Jul. 8, 2004

(30) Foreign Application Priority Data

Sep. 6, 2002 (DE) .................... 102 41 423

(51) Int. Cl.
*G21K 1/02* (2006.01)
*B29C 35/04* (2006.01)
*B29C 35/08* (2006.01)

(52) U.S. Cl. ............... 378/149; 378/154; 264/401; 264/497

(58) Field of Classification Search ............ 378/19, 378/98.8, 147, 149, 154, 155; 250/363.1, 250/370.09, 505.1; 264/401, 497
See application file for complete search history.

(56) References Cited

U.S. PATENT DOCUMENTS 4,125,776 A * 11/1978 Tosswill et al. ............ 378/149

(Continued)

FOREIGN PATENT DOCUMENTS

DE 101 47 949 A1 4/2003

(Continued)

OTHER PUBLICATIONS

G.A. Kastis et al., "A Small-Animal Gamma-Ray Imager Using a Cdznte Pixel Array and a High Resolution Parallel Hole Collimator", Jan. 7, 2002.

(Continued)

*Primary Examiner*—Allen C. Ho
(74) *Attorney, Agent, or Firm*—Harness, Dickey & Pierce, P.L.C.

(57) ABSTRACT

A method is for producing and applying an antiscatter grid or collimator to an x-ray or gamma detector having matricially arranged detector elements which form a detector surface with detection regions sensitive to x-radiation and/or gamma radiation and less sensitive intermediate regions. In the method, a basic structure is firstly produced for the antiscatter grid or collimator by way of a rapid prototyping technique, through which transmission channels and intermediate walls of the antiscatter grid or collimator are formed which have at least in a first direction a center-to-center spacing which is equal to or an integral multiple of a center-to-center spacing of the sensitive detection regions of the detector. The intermediate walls are coated with a material which strongly absorbs x-radiation and/or gamma radiation in order to finish the antiscatter grid or collimator. Subsequently, the antiscatter grid or collimator is applied to the detector surface and connected to the detector surface in such a way that at least the intermediate walls running perpendicular to the first direction, or their coating, are situated over the less sensitive intermediate regions of the detector surface. A detector having an antiscatter grid or collimator in which no moiré interference occurs can thus be realized in a simple way.

34 Claims, 4 Drawing Sheets

U.S. PATENT DOCUMENTS

| | | | | |
|---|---|---|---|---|
| 4,575,330 A | * | 3/1986 | Hull | 425/174.4 |
| 5,123,734 A | | 6/1992 | Spence et al. | 356/121 |
| 5,127,037 A | * | 6/1992 | Bynum | 378/4 |
| 5,231,655 A | * | 7/1993 | Wei et al. | 378/147 |
| 5,418,833 A | * | 5/1995 | Logan | 378/154 |
| 5,606,589 A | * | 2/1997 | Pellegrino et al. | 378/154 |
| 6,021,173 A | | 2/2000 | Brauers et al. | 378/98.8 |
| 6,175,615 B1 | * | 1/2001 | Guru et al. | 378/149 |
| 6,309,581 B1 | * | 10/2001 | Gervasi | 264/401 |
| 6,459,771 B1 | * | 10/2002 | Mancini | 378/154 |
| 6,627,376 B1 | * | 9/2003 | Ueno | 430/269 |
| 6,778,632 B1 | * | 8/2004 | Hoheisel et al. | 378/98.8 |
| 6,847,701 B1 | * | 1/2005 | Hoheisel et al. | 378/154 |
| 6,936,212 B1 | * | 8/2005 | Crawford | 264/308 |
| 6,951,628 B1 | * | 10/2005 | Eidam et al. | 264/401 |
| 6,980,629 B1 | * | 12/2005 | Hoheisel et al. | 378/149 |
| 2003/0076929 A1 | | 4/2003 | Hoheisel et al. | 378/98.8 |
| 2003/0081731 A1 | * | 5/2003 | Souchay et al. | 378/154 |
| 2003/0089857 A1 | | 5/2003 | Hoheisel et al. | 378/154 |

FOREIGN PATENT DOCUMENTS

| | | |
|---|---|---|
| DE | 101 51 562 A1 | 5/2003 |
| DE | 101 51 568 A1 | 5/2003 |

OTHER PUBLICATIONS

Gebhardt, Andreas. "Rapid Prototyping." Hanser Gardner Publications, Munich, Germany, 2003.

* cited by examiner

FIG 7

METHOD FOR PRODUCING AND APPLYING AN ANTISCATTER GRID OR COLLIMATOR TO AN X-RAY OR GAMMA DETECTOR

The present application hereby claims priority under 35 U.S.C. §119 on German patent application number DE 10241423.8 filed Sep. 6, 2002, the entire contents of which are hereby incorporated herein by reference.

FIELD OF THE INVENTION

The present invention generally relates to a method for producing and applying an antiscatter grid or collimator to an x-ray or gamma detector. Preferably, it relates to a method for producing and applying an antiscatter grid or collimator to an x-ray or gamma detector having an array of detector elements which form a detector surface with detection regions sensitive to x-radiation and/or gamma radiation and less sensitive intermediate regions. It further generally relates to an x-ray and gamma detector having an antiscatter grid or collimator which has been produced and applied using this method.

BACKGROUND OF THE INVENTION

In radiography, stringent requirements are currently placed on the image quality of the x-ray images. In such images, as are taken especially in medical x-ray diagnosis, an object to be studied is exposed to x-radiation from an approximately point radiation source, and the attenuation distribution of the x-radiation is registered two-dimensionally on the opposite side of the object from the x-ray source. Line-by-line acquisition of the x-radiation attenuated by the object can also be carried out, for example in computer tomography systems.

Besides x-ray films and gas detectors, solid-state detectors are being used increasingly as x-ray detectors, these generally having a matrix shaped arrangement of optoelectronic semiconductor components as photoelectric receivers. Each pixel of the x-ray image should ideally correspond to the attenuation of the x-radiation by the object on a straight axis from the point x-ray source to the position on the detector surface corresponding to the pixel. X-rays which strike the x-ray detector from the point x-ray source in a straight line on this axis are referred to as primary beams.

The x-radiation emitted by the x-ray source, however, is scattered in the object owing to inevitable interactions, so that, in addition to the primary beams, the detector also receives scattered beams, so-called secondary beams. These scattered beams, which, depending on the properties of the object, can cause up to 90% or more of the total signal response of an x-ray detector in diagnostic images, constitute an additional noise source and therefore reduce the identifiability of fine contrast differences. This substantial disadvantage of scattered radiation is due to the fact that, owing to the quantum nature of the scattered radiation, a significant additional noise component is induced in the image recording.

In order to reduce the scattered radiation components striking the detectors, so-called antiscatter grids are therefore interposed between the object and the detector. Antiscatter grids consist of regularly arranged structures that absorb the x-radiation, between which transmission channels or transmission slits for minimally attenuated transmission of the primary radiation are formed. These transmission channels or transmission slits, in the case of focused antiscatter grids, are aligned with the focus of the x-ray tube according to the distance from the point x-ray source, that is to say the distance from the focus. In the case of unfocused antiscatter grids, the transmission channels or transmission slits are oriented perpendicularly to the surface of the antiscatter grid over its entire area. However, this leads to a significant loss of primary radiation at the edges of the image recording, since a sizeable part of the incident primary radiation strikes the absorbing regions of the antiscatter grid at these points.

In order to achieve a high image quality, very stringent requirements are placed on the properties of x-ray antiscatter grids. The scattered beams should, on the one hand, be absorbed as well as possible, while on the other hand, the highest possible proportion of primary radiation should be transmitted unattenuated through the antiscatter grid. It is possible to achieve a reduction of the scattered beam component striking the detector surface by a large ratio of the height of the antiscatter grid to the thickness or diameter of the transmission channels or transmission slits, that is to say by a high aspect ratio.

The thickness of the absorbing structure elements or wall elements lying between the transmission channels or transmission slits, however, can lead to image perturbations by absorption of part of the primary radiation. Specifically when solid-state detectors are used, inhomogeneities of the grids, that is to say deviations of the absorbing regions from their ideal position, cause image perturbations by projection of the grids in the x-ray image.

In order to minimize image perturbations due to antiscatter grids, it is known to move the grids in a lateral direction during the recording. In the case of very short exposure times of, for example, 1–3 ms, however, stripes may also occur in the image if the movement speed of the grids is insufficient. Even in the event of very long exposure times, perturbing stripes may occur owing to reversal of the grid movement direction during exposure.

In recording x-ray images, increasing use has recently been made of solid-state detectors which are formed from a plurality of an array of detector elements. The detector elements are arranged in this case in a generally square or rectangular grating. In the case of such solid-state detectors, as well, there is a need to employ effective suppression measures to reduce as far as possible the striking of scattered beams on the detector surface formed by the detector elements. Because of the regular structuring of the pixels, formed by the detector elements, of the detector, there is here, in addition, the risk of mutual interference between the structures of pixels and antiscatter grids. Disturbing moiré phenomena can thereby arise. These can certainly in specific instances be minimized or removed by a downstream image processing measure. However, this is possible only when their projection image on the detector is absolutely immutable.

The same problem occurs in nuclear medicine, especially when using gamma cameras, for example Anger cameras. With this recording technique also, as with x-ray diagnosis, it is necessary to ensure that the fewest possible scattered gamma quanta reach the detector. In contrast to x-ray diagnosis, the radiation source for the gamma quanta lies inside the object in the case of nuclear diagnosis. In this case, the patient is injected with a metabolic preparation labeled with particular unstable nuclides, which then becomes concentrated in a manner specific to the organ.

By detecting the decay quanta correspondingly emitted from the body, a picture of the organ is then obtained. The profile of the activity in the organ as a function of time permits conclusions about its function. In order to obtain an image of the body interior, a collimator that sets the projection direction of the image needs to be placed in front of the gamma detector. In terms of functionality and structure, such a collimator corresponds to the antiscatter grid in x-ray diagnosis. Only the gamma quanta dictated by the preferential direction of the collimator can pass through the collimator, and quanta incident obliquely to it are absorbed in the collimator walls. Because of the higher energy of gamma quanta compared with x-ray quanta, collimators need to be made many times higher than antiscatter grids for x-radiation.

For instance, scattered quanta may be deselected during the image recording by taking only quanta with a particular energy into account in the image. However, each detected scattered quantum entails a dead time in the gamma camera of, for example, one microsecond, during which no further events can be registered. Therefore, if a primary quantum arrives shortly after a scattered quantum has been registered, it cannot be registered and it is lost from the image.

Even if a scattered quantum coincides temporally—within certain limits—with a primary quantum, a similar effect arises. Since the evaluation electronics can then no longer separate the two events, too high an energy will be determined and the event will not be registered. Both said situations explain how highly effective scattered beam suppression leads to improved quantum efficiency in nuclear diagnosis as well. As the end result, an improved image quality is thereby achieved for equal dosing of the applied radionuclide or, for equal image quality, a lower radionuclide dose is made possible, so that the patient's beam exposure can be reduced and shorter image recording times can be achieved.

In future, increasing use will also be made for recording gamma images of solid-state detectors which are formed from an array of detector elements. The detector elements are arranged in this case in a generally square or rectangular grating. In the case of such solid-state detectors, as well, there is a need to employ effective suppression measures to reduce as far as possible the striking of scattered beams on the detector surface formed by the detector elements. Because of the regular structuring of the pixels, formed by the detector elements, of the detector, there is here, in addition, the risk of mutual interference between the structures of pixels and collimators.

Collimators for gamma cameras are generally produced from mechanically folded lead lamellae. This is a relatively cost-efficient solution. However, it has the disadvantage that, in particular when using solid-state cameras with an array of detector elements, for example in the case of cadmium-zinc telluride detectors, perturbing aliasing effects can arise because the structure of these collimators is then relatively coarse.

The publication by G. A. Kastis et al., "A Small-Animal Gamma-Ray Imager Using a CdZnTe Pixel Array and a High Resolution Parallel Hole Collimator" discloses a method for producing a cellularly constructed collimator for gamma radiation. In this case, the collimator is produced from laminated layers of metal films, here made of tungsten, which are photochemically etched. However, on account of the large number of photolithographic exposure and etching steps, this production method is very elaborate and cost-intensive.

U.S. Pat. No. 6,021,173 A describes an approach which is intended to avoid moiré structures during operation of an x-ray detector having an array of detector elements in conjunction with an antiscatter grid arranged in a stationary fashion. In this publication, the antiscatter grid is applied directly to the x-ray detector over the detector surface. The absorbing structure elements of the antiscatter grid are designed at a spacing from one another which is smaller than the extent of the smallest resolvable detail in the x-ray image. The regularly arranged absorbing structure elements are consequently formed at so high a spatial frequency The post-published German patent application DE 101 51 568 discloses a method for applying an antiscatter grid to an x-ray detector in the case of which a basic structure for the antiscatter grid is produced directly on the detector surface by way of a rapid prototyping technique such that absorbing regions of the antiscatter grid are situated in less sensitive intermediate regions of the x-ray detector. However, the risk exists in this method of damaging the x-ray detector when producing the antiscatter grid.

SUMMARY OF THE INVENTION

An object of an embodiment of the present invention to specify a method for producing and applying an antiscatter grid or collimator to an x ray or gamma detector having an array of detector elements and with the aid of which it is possible to realize an arrangement of an antiscatter grid or collimator on an x-ray or gamma detector which permits image recording without moiré structures in conjunction with a high detective quantum efficiency.

An object may be achieved by a method of the present application. An embodiment specifies an x ray and gamma detector having an antiscatter grid or collimator produced and applied in accordance with the method. Advantageous refinements of the method can be gathered from the following description and the exemplary embodiments.

In an embodiment of the present method, a basic structure for the antiscatter grid or collimator is firstly produced by means of a rapid prototyping technique, preferably with the aid of the technique of stereolithography, through which transmission channels and intermediate walls of the antiscatter grid or collimator are formed which have at least in a first direction a center-to-center spacing which is equal to or an integral multiple of the center-to-center spacing of the sensitive detection regions of the detector. The intermediate walls are subsequently coated with a material which strongly absorbs x-radiation and/or gamma radiation in order to finish the antiscatter grid or collimator. The basic structure coated in this way, that is to say the antiscatter grid or collimator, is subsequently applied to the detector surface, and connected to the latter, in such a way that at least the intermediate walls running perpendicular to the first directions, or their coating, are situated over the less sensitive intermediate regions of the detector surface. These intermediate regions of the detector surface which are less or not sensitive correspond to the regions in which the individual detector elements abut one another. Since the detector elements are additionally generally not sensitive to radiation over the entire surface, such insensitive intermediate regions arise in the edge regions of the individual detector elements.

The basic structure for the antiscatter grid or collimator is constructed in the case of the present method in such a way that at least in one direction the intermediate walls or the absorbing coating provided on the intermediate walls inside the transmission openings extend on one side of the intermediate walls over the intermediate regions on the detector. If, because of particularly narrow intermediate regions, the intermediate walls cannot be produced with a sufficiently small thickness, they can be situated in the contact region with the detector surface at least partially over the intermediate regions.

The intermediate walls extending in the other direction are preferably likewise arranged in such a way that they or their coating are situated on one side over the non-sensitive intermediate regions of the detector surface. In both dimensions, the spacings of the intermediate walls can thereby assume the value of an integral multiple of the center-to-center spacing of the sensitive detection regions of the detector. However, the center-to-center spacings of the intermediate walls preferably correspond in both mutually perpendicular directions to the corresponding center-to-center spacings of the sensitive detection regions.

By using a rapid prototyping technique when constructing the basic structure, very filigree structures can be produced with very high accuracy. In the rapid prototyping technique, 3D CAD designs, here the geometry of the basic structure, are converted into volume data in the CAD system. The 3D volume model for the rapid prototyping is then divided into cross sections in a computer. The cross sections have a layer thickness of 100 μm or less. After the data have been sent to a rapid prototyping system, the original shape is built up layer by layer. The present method in this case uses a rapid prototyping technique in which the layer construction is carried out by action of radiation, in particular laser radiation. Laser radiation, specifically, offers the advantage of producing very filigree structures in this case.

In a preferred embodiment of the present method, the technique of stereolithography is used for constructing the basic structure. In this method, a computer-controlled UV laser beam forms the respective contours of the individual layers of the 3D volume model of the basic structure on a liquid polymer resin. The resin is cured under the action of the laser at the exposed points or areas. The component platform of the system is then lowered, and a new thin layer of photopolymer resin is applied. By repeating these steps, the complete geometry of the basic structure is successively constructed from the bottom upward. In one embodiment of the present method, it is also possible to use the technique of microstereolithography to produce the basic structure.

By comparison with the post-published document specified in the introduction to the description, the production and application of an antiscatter grid or collimator directly onto the detector is simplified by the present method and can be realized more cost-effectively. Owing to the configuration and proposed application of the antiscatter grid or collimator in the specified way such that one or two of the total of four intermediate walls or their coating correspond sufficiently on one side with a boundary line between the detector pixels, the required dose when using this antiscatter grid or collimator is reduced. On the basis of this arrangement in regions which have a lesser sensitivity to the x ray or gamma radiation, the intermediate walls or the absorbing coating provided thereon act to attenuate primary beams less or not at all. The proposed configuration and the application of the antiscatter grid or collimator principally in the said intermediate regions additionally excludes interference with the pixel structure of the detector.

The detectors virtually always have a filling factor which is smaller than 1. This holds, in particular, for a Si detector surfaces coated with phosphor. Even in the case of detector surfaces coated with selenium, the filling factor differs from 1, particularly for small detection regions or pixels. Consequently, the quantum efficiency is primarily reduced in the regions between the pixel surfaces. If the primary radiation is now attenuated only between the pixels by structures absorbing the scattered beams, this is more advantageous for achieving a high quantum efficiency than if these structures are arranged arbitrarily. Moiré interference between the pixels and the absorbing structure is thereby impossible. The present arrangement of the antiscatter grid or collimator thus permits the primary radiation to be more effectively rendered useful, since the unavoidable primary absorption of the antiscatter grid or collimator occurs chiefly in geometrical regions of the detector which make a reduced contribution to the image signal.

In a preferred embodiment of the present method, the end faces of the intermediate walls are kept free of the absorbing coating, or the absorbing coating possibly applied is removed from these end faces. Here, the end faces are understood to be the sides of the intermediate walls which face the detector, and the sides which are averted from the detector, that is to say the sides which are not situated inside the transmission channels. These end faces can be kept free, for example, by appropriate masks when the coating is being applied. However, the coating is preferably applied to the entire basic structure and subsequently removed by an appropriate chemical or mechanical method.

If, moreover, use is made as material of the basic structure of a material which is substantially transparent to x-radiation and/or gamma radiation, the primary beam transmission of the antiscatter grid or collimator is substantially increased by this measure, since it is possible even in the material regions between the coated inner surfaces of the intermediate walls for appropriate primary radiation to pass through without attenuation or only slight attenuation and to contribute to the construction of the image. When use is made of the technique of stereolithography for constructing the basic structure, such a refinement can be realized without difficulty by selecting a suitable polymer. Applying the absorbing layer can be performed in this case by various known methods, for example vapor deposition, by sputtering or by an electrolytic process. One possibility for applying the layer also consists in using sputtering to apply a thin metal layer which then serves as starting layer for subsequent electrolytic deposition of the layer.

In a further advantageous refinement of the present method, the antiscatter grid or collimator is applied to the detector surface and connected to the latter in such a way that in each case a corner region of the coating inside a transmission channel comes to be situated over a switching element of a detector element. Switching elements of this type, such as a diode or TFT, have no photosensitivity at all, and therefore make no contribution to the detection of radiation. Consequently, the attenuation of the primary radiation in this region has no great influence owing to the positioning of the corner regions of the coating over these switching elements.

Various techniques can be used for the adjusted application of the antiscatter grid or collimator to the detector surface. One technique consists in marking the precise desired position of the basic structure with reference to the pixels, situated therebelow, of the detector as fiducial markers or reference lines on the surface of the detector or on a protective layer which is applied to the scintillator. If appropriate, the desired position can also be projected on optically.

The marking of the desired position can be controlled by means way of infrared microscopy. Subsequently, the antiscatter grid or collimator is connected to the detector surface, for example by bonding. In this case, the bonding is performed step by step such that a small subarea is firstly bonded after the position of the basic structure in relation to the pixels has been precisely set in this region. Thereafter, the position in the adjacent subareas is corrected with the aid of visual support, for example under microscopic control and/or by using a projector which projects the desired position of the basic structure onto the mounting surface, and bonded further subarea by subarea. For this procedure, the antiscatter grid or collimator can also be decomposed into smaller segments before being applied, for example by cutting with a laser beam. This facilitates the bonding, because then it is respectively necessary to adjust and apply only small areas in each adhesion step. The cutting gaps produced by cutting the antiscatter grid or collimator must, however, be executed to be so small that they do not lead to any perturbing artifacts in the image.

A further possibility for applying the antiscatter grid or collimator to the detector surface resides in using the flip-chip technique known from semiconductor technology. Instead of the chip, the antiscatter grid or collimator is thereby applied to the detector surface instead of the substrate. Since the grid or segment to be bonded on is mechanically unstable, it is preferable to use a stable mechanical holder for the antiscatter grid or collimator or the segments. This holder can consist, for example, of a partial height of the negative of the basic structure. The negative can be produced, for example, by saw slits in a metal plate. Instead of saw slits, it is also possible to design this holding plate with a plurality of adjusting pins which can be inserted into the transmission openings of the basic structure.

A further possibility for positioning the antiscatter grid or collimator accurately in relation to the pixels of the detector consists resides in undertaking this adjustment in the presence of x-radiation or gamma radiation. Use is made in this case of the fact that the position of the antiscatter grid or collimator in relation to the pixel arrangement is optimum whenever the output signal of the detector assumes the maximum in this position. For this purpose, the position of the antiscatter grid or collimator is firstly adjusted, and bonded, in a relatively small segment of the detector. Thereafter, the further segments are successively adjusted and bonded.

Various adhesives can be used in an embodiment of the present invention. Thus, for example, an adhesive liquid can be sprayed in the region to be fixed onto the detector surface, or else the antiscatter grid or collimator, before these are interconnected. A further possibility consists in using a soft, thermally melting adhesive which is applied before mounting to the detector surface and/or the antiscatter grid or collimator. By using a local heat source such as hot air, for example, the adhesive is only briefly melted with the antiscatter grid or collimator correctly positioned, in order to interconnect the grid or collimator and detector.

Of course, any desired detector types are possible as x ray or gamma detectors to which an antiscatter grid or collimator can be applied using the present method. Thus, for example, it is possible to use detectors having a photoconducting material, or else detectors to which a scintillator layer has been applied.

BRIEF DESCRIPTION OF THE DRAWINGS

The present method will be explained again briefly below with the aid of exemplary embodiments in conjunction with the drawings, without restricting the general inventive concept.

DETAILED DESCRIPTION OF THE PREFERRED EMBODIMENTS

Figure 1:
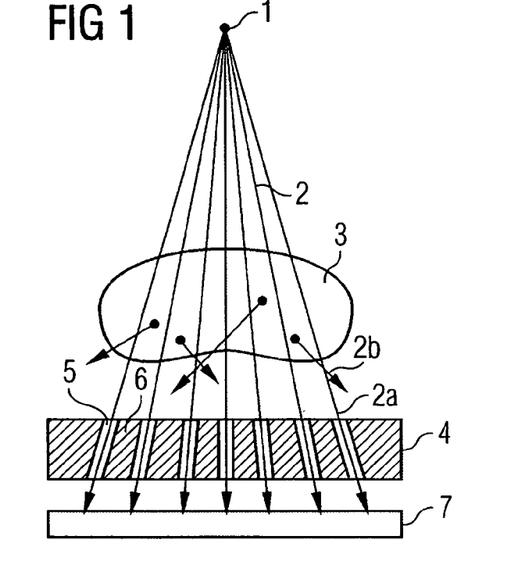
FIG. 1 shows the situation when recording x ray images of an object using an antiscatter grid.

The typical situation when recording an x-ray image of an object 3 in x-ray diagnosis is represented schematically with the aid of FIG. 1. The object 3 lies between the tube focus 1 of an x-ray tube, which may be regarded as an approximately point x-ray source, and a detector surface 7. The x-rays 2 emitted from the focus 1 of the x-ray source propagate in a straight line in the direction of the x-ray detector 7, and in doing so pass through the object 3. The primary beams 2a striking the detector surface 7, which pass through the object 3 on a straight line starting from the x-ray focus 1, cause, on the detector surface 7, a positionally resolved attenuation value distribution for the object 3.

Some of the x-ray beams 2 emitted from the x-ray focus 1 are scattered in the object 3. The scattered beams 2b created in this case do not contribute to the desired image information and, when they strike the detector 7, they significantly impair the signal-to-noise ratio. In order to improve the image quality, an antiscatter grid 4 is therefore arranged in front of the detector 7. This antiscatter grid 4 has transmission channels 5 and a basic structure 6 which consists of includes an absorbing material in the case of the prior art represented.

The transmission channels 5 are aligned in the direction of the tube focus 1, so that they allow the incident primary radiation 2a on a straight-line path to strike the detector surface. Beams not incident in this direction, in particular the scattered beams 2b, are blocked or significantly attenuated by the absorbing intermediate walls of the basic structure 6. However, on the basis of the previously known production techniques, the absorbing intermediate walls can be produced only with a particular minimum thickness, so that a significant part of the primary radiation 2a is therefore also absorbed and does not contribute to the image result.

Figure 2:
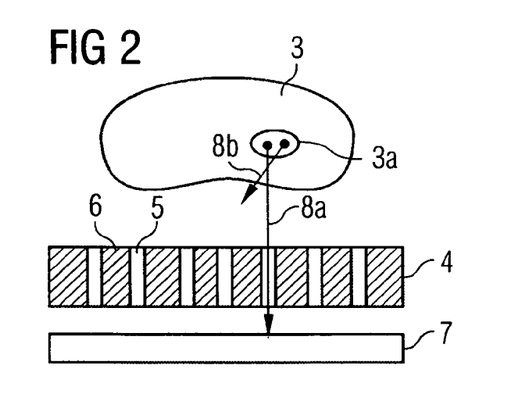
FIG. 2 shows the situation when recording the object in nuclear medicine using a collimator.

FIG. 2 shows the situation when recording images in nuclear diagnosis. The body 3 to be examined, in which an organ 3a is indicated, can be seen in the figure. By injection of a medium which emits gamma radiation, and which concentrates in the organ 3a, gamma quanta 8a are emitted from this region and strike the detector 7, an Anger camera. By means use of the collimator 4 arranged in front of the detector 7, which has transmission channels 5 aligned in a straight line between intermediate walls of the basic structure 6 that absorb gamma radiation, the projection direction of the respective image recording is set. Gamma quanta 8b which are emitted in other directions or are scattered, and which do not arrive on a straight-line path from this projection direction, are absorbed by the collimator 4. In this technique as well, however, a significant part of the primary radiation 8a is still absorbed because the absorbing intermediate walls of the basic structure 6 are not arbitrarily thin.

An embodiment of The the present invention may be implemented by using a method which permits very precise manufacture of antiscatter grids or collimators with very thin intermediate or separating walls between the transmission channels 5. In this case, a rapid prototyping technique is used for producing the antiscatter grid or collimator.

Figure 3:
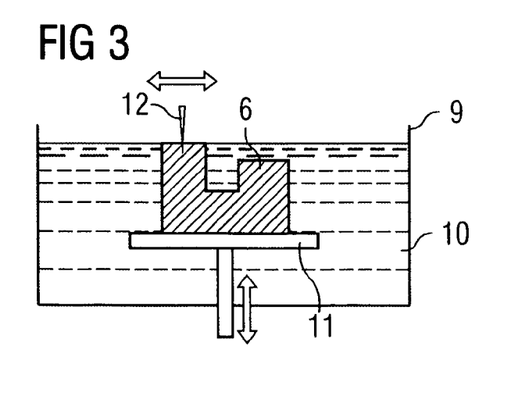
FIG. 3 shows a representation of the technique of stereolithography when constructing a structure.

An example of such a technique is stereolithography, as illustrated with the aid of the representation in FIG. 3. In this technique, a UV laser beam 12 is directed onto the surface of a liquid UV-crosslinkable polymer 10, which is situated in a container 9. The UV laser beam 12 is moved, with the aid of a three-dimensional volume model of the basic structure 6 to be made, over the surface of the liquid polymer 10 in order to construct the basic structure 6 layer-wise. After a layer has been solidified, it is lowered by a further layer thickness using a construction platform 11, so that the UV laser 12 can solidify the next layer according to the three-dimensional volume model. In this way, the basic structure 6 is constructed layer by layer from the crosslinked UV-cured polymer 10.

Owing to the good focusability of the UV laser beam 12, very filigree structures can in this case be produced with very high accuracy. The basic structure 6 may be constructed directly on the construction platform 11 or on an additional support plate (not represented in the figure). Furthermore, the technique of stereolithography may also be used to directly construct a baseplate, on which the basic structure 6 is then formed according to the desired geometry.

FIG. 4 shows an example of carrying out an embodiment of the present method. In this embodiment, a basic structure 6 is produced accordingly for the antiscatter grid or collimator to be made from a structural material which is substantially transmissive to x-radiation, for example a UV-cured polymer. The basic structure 6 is subsequently coated (coating step 13; FIG. 4*a*) with an absorbing material of high atomic number. Respectively to be seen in the individual part- FIGS. 4*a*–4*b* are a detail of the basic structure 6 with the transmission channels 5 and the intermediate walls 6*a* and of the antiscatter grid or collimator, respectively, in cross section in the upper part, and in plan view in the lower part. This coating step 13 results in a basic structure 6 with a strongly absorbing coating 14 which is applied both to the inner surfaces of the intermediate walls 6*a* in the transmission channels 5, and to the top side and underside 6*b* of the basic structure 6, that is to say to the end faces of the intermediate walls 6*a* (FIG. 4*b*).

Figure 4A:
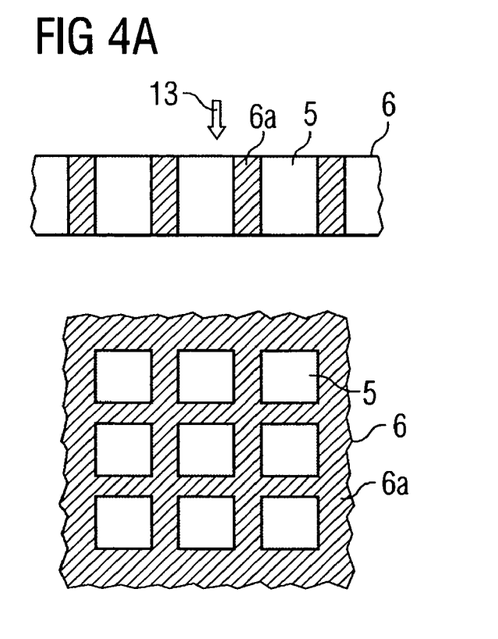
FIG. 4 shows an example of carrying out the present method.
Figure 4B:
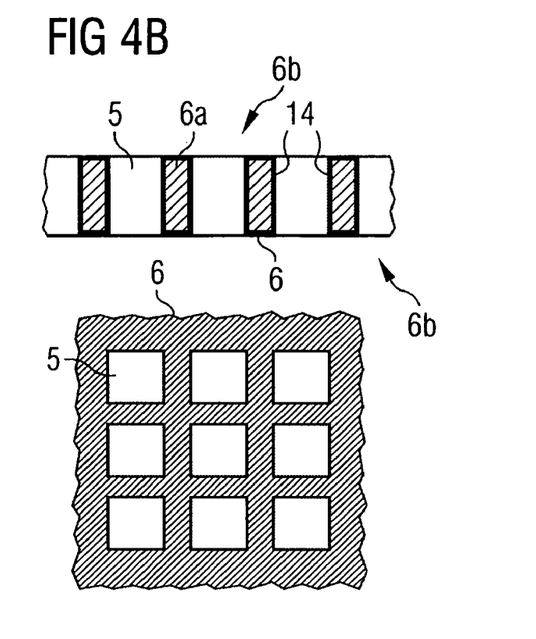
Figure 4C:
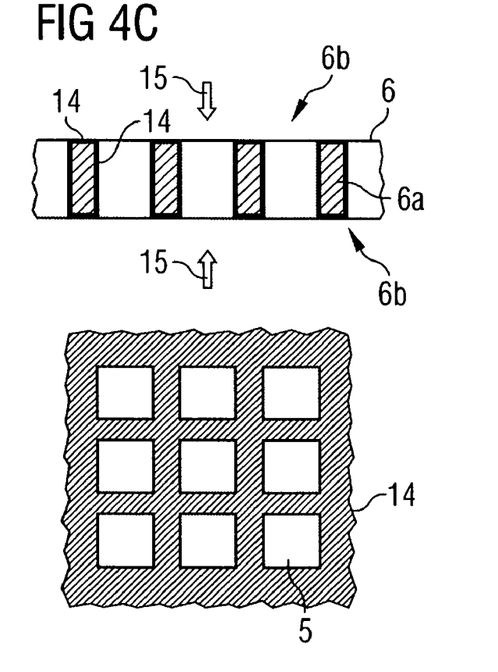
Figure 4D:
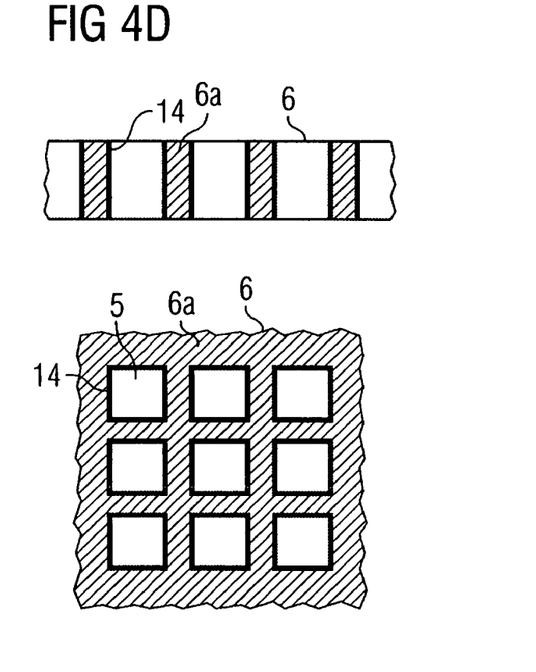

Finally, the coating 14 is removed at the end faces of the intermediate walls 6*a* by a chemical or mechanical method step, for example a chemical etching step 15 (FIG. 4*c*). An antiscatter grid or collimator is obtained in this way which has transmission channels 5 that are situated between the absorbing coatings 14 of the intermediate walls 6*a* of the basic structure 6 (FIG. 4*d*). The intermediate walls 6*a* likewise form with the coatings 14 delimiting them transmission channels for the primary radiation which have a very high aspect ratio.

For application of the coating 14, a thin copper layer may, for example, firstly be applied to the surface of the basic structure 6 by sputtering. The thickness of this copper layer lies in the ¹/₁₀ μm range. A lead-tin alloy is finally applied to this layer by electrolytic deposition. The thickness of this alloy is designed so as to achieve the necessary absorption of the secondary radiation.

Figure 4E:
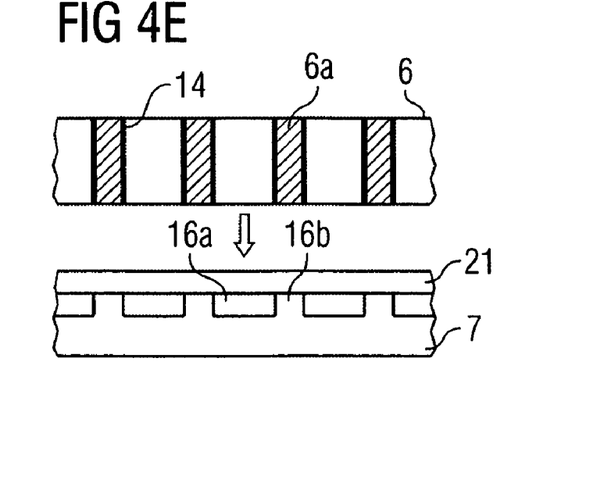

After finishing the antiscatter grid or collimator, the latter is bonded onto the detector 7 in such a way that the intermediate walls 6*a* are situated over less sensitive intermediate regions 16*b* of the detector (FIG. 4*e*). A detail of the detector 7 with the matricially arranged detector elements 16 is illustrated in FIG. 4*e*. The detector elements 16 form a detector surface having regions 16*a* which are sensitive to x-rays or gamma rays, and insensitive intermediate regions 16*b*.

After finishing the antiscatter grid or collimator, the latter is bonded onto the detector 7 in such a way that the intermediate walls 6*a* are situated over less sensitive intermediate regions 16*b* of the detector (FIG. 4*e*). A thermally melted adhesive 21 is applied to the detector 7 before the antiscatter grid or collimator is mounted to the detector 7. A detail of the detector 7 with the array of detector elements 16*a*, 16*b* is illustrated in FIG. 4*e*. The detector elements 16*a*, 16*b* form a detector surface having regions 16*a* which are sensitive to x-rays or gamma rays, and insensitive intermediate regions 16*b*.

Figure 5:
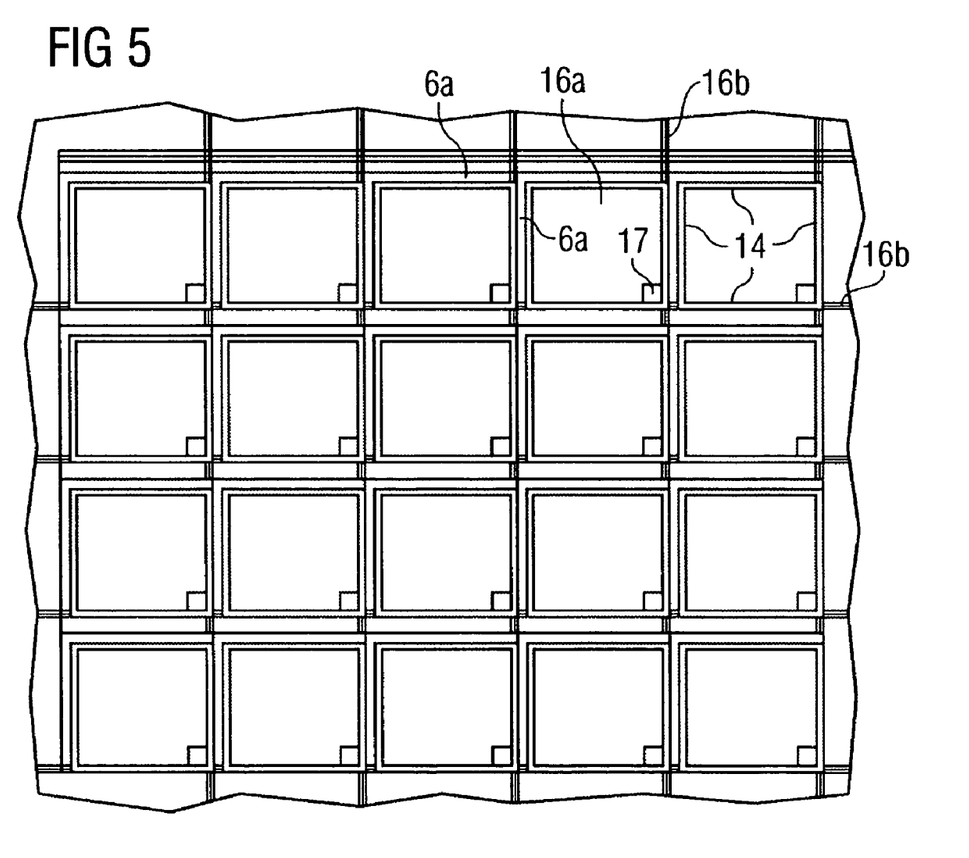
FIG. 5 shows an example of the arrangement, realized using the method, of antiscatter grid or collimator and detector.

FIG. 5 shows a result of the method illustrated in FIG. 4. To be seen in plan view in the figure is a detail of an x-ray detector 7 with the array of detector elements 16*a*, 16*b* and the antiscatter grid bonded thereon. The detector elements 16*a*, 16*b* are assembled from the radiation-sensitive detector regions 16*a* and radiation-insensitive intermediate regions 16*b*. The detector elements 16*a*, 16*b* are also referred to as pixels. Such an x ray detector 7 can have, for example, 3000×3000 pixels with dimensions of 143×143 μm. To be seen in the left-hand corner region of each detector surface is a switching element 17, for example a TFT, which does not contribute to the detection of radiation.

FIG. 5 shows an exemplary embodiment in which a wall thickness of approximately 20 μm was implemented for the intermediate walls 6*a* of the basic structure 6 of the antiscatter grid. As may be seen from the figure, the antiscatter grid is positioned with the intermediate walls 6*a* over the radiation-insensitive regions 16*b* of the detector 7. The absorbing coating 14 is present here only inside the transmission channels 5, and so attenuation of the primary radiation occurs only at this point. The wider wall regions 6*a* between this coating 14 have a relatively high transmission for the primary radiation, and so these can likewise be regarded as transmission regions. These intermediate walls 6*a* are formed in the present example from a polymer which attenuates the x-radiation only insubstantially. Arranged at the crossing point of the radiation-insensitive regions 16*b* of the detector 7 are the corresponding switching elements 17 over which corner regions of the absorbing coating 14 are situated in the present example.

The production of such an arrangement of antiscatter grid or collimator and detector can be implemented simply and cost-effectively. In particular, it is advantageous in this case that a fault in the production of the grid does not lead automatically to the destruction of the entire detector. By keeping the end faces of the intermediate walls 6*a* free of the absorbing coating 14, it is possible to achieve a better primary beam transparency than with conventional grids. The permanent connection of the grid and the detector in conjunction with the partial correspondence of the structures in the intermediate walls 6*a* and pixel boundaries achieves an improved sensitivity of the detector, and so dosage can be saved. Moiré interference is avoided in the same way by this configuration. The transmission channels 5 illustrated in white in the figure are generally filled with air or gas.

Figure 6:
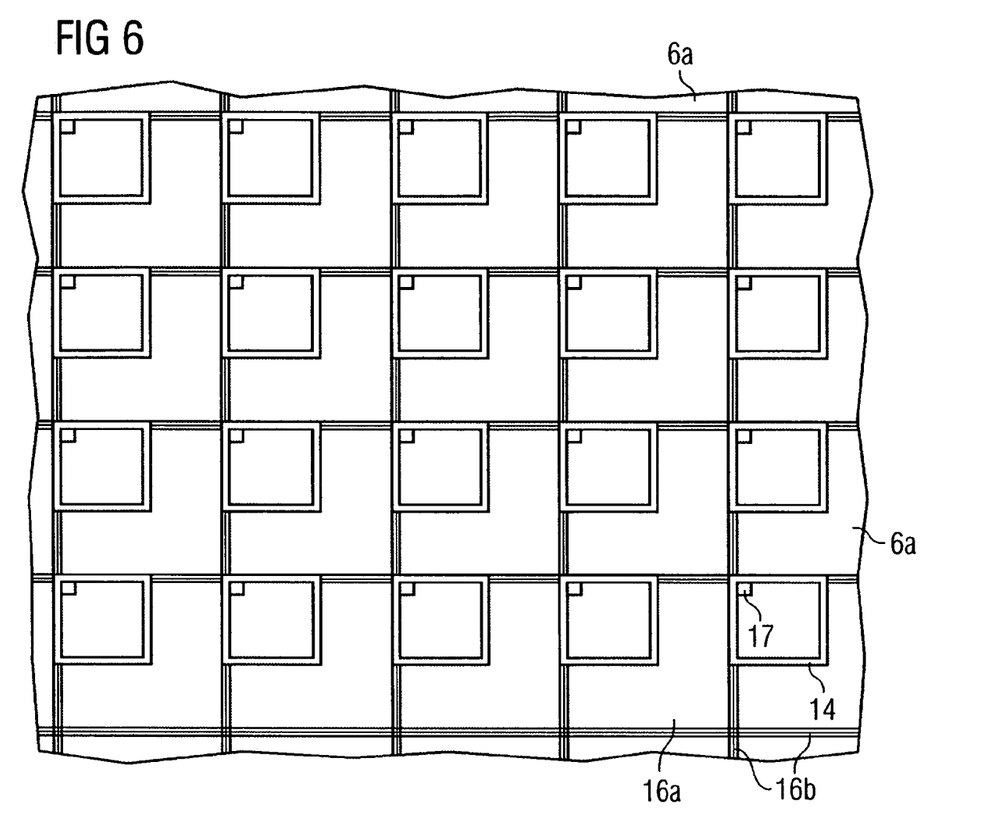
FIG. 6 shows a second example of the arrangement, realized using the method, of antiscatter grid or collimator and detector.

FIG. 6 shows a further example, in the case of which the intermediate walls 6*a* of the antiscatter grid have a thickness of approximately 70 μm, and can therefore be produced very easily by stereolithography. In this case, as well, a similar primary beam transparency is achieved as in the case of the configuration of FIG. 5, since the absorber coating 14 on the end faces of the intermediate walls 6*a* is removed, and thus primary radiation can also strike the detector 7 at these points.

Figure 7:
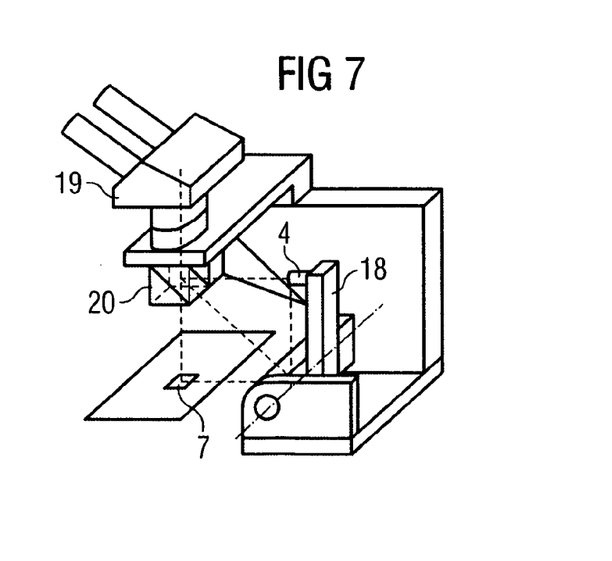
FIG. 7 shows a system for applying the antiscatter grid or collimator.

FIG. 7 shows a system for applying the finished antiscatter grid or collimator to the detector by means way of flip-chip technology. The exact position of the antiscatter grid or collimator picked up with the aid of the manipulator arm 18, or else of a segment thereof, is controlled via a microscope 19 with the aid of which two images, superimposed by means way of a beam splitter 20, of the detector surface and of the antiscatter grid or collimator can be viewed and can be brought into coincidence by displacement. If necessary, it is also possible to carry out a limited rotation of the detector for this purpose. If the reciprocal position is adjusted, the antiscatter grid is applied to the prepared bonded joint in an accurately positioned fashion by means of the manipulator. An appropriately designed carrier plate with corresponding depressions or holding pins is preferably used for holding the grid.

The invention being thus described, it will be obvious that the same may be varied in many ways. Such variations are not to be regarded as a departure from the spirit and scope of the invention, and all such modifications as would be obvious to one skilled in the all are intended to be included within the scope of the following claims.

What is claimed is:

1. A method for producing and applying at least one of an antiscatter grid and collimator to at least one of an x-ray and gamma detector having an array of detector elements which form a detector surface with detection regions sensitive to at least one of x-radiation and gamma radiation and less sensitive intermediate regions, comprising:
   producing a basic structure through layer-wise solidification by using a rapid prototyping technique to form transmission channels and intermediate walls of at least one of the antiscatter grid and collimator, including at least in a first direction a center-to-center spacing at least one of equal to and an integral multiple of a center-to-center spacing of the sensitive detection regions of the detector;
   coating the intermediate walls with a material which strongly absorbs at least one of x-radiation and gamma radiation; and
   applying at least one of the antiscatter grid and collimator to the detector surface and connecting at least one of the antiscatter grid and collimator to the detector surface in such a way that at least one of the intermediate walls running perpendicular to the first direction and their coating, are situated over relatively less sensitive intermediate regions of the detector surface.

2. The method as claimed in claim 1, wherein a method of stereolithography is used as the rapid prototyping technique.

3. The method as claimed in claim 2, wherein the coating is performed by at least one of sputtering and electrolytic deposition.

4. The method as claimed in claim 2, wherein at least one of the antiscatter grid and collimator is applied to the detector surface and connected to the detector surface in such a way that in each case a corner region of the coating with the absorbing material of a transmission channel is situated over a switching element of a detector element.

5. The method as claimed in claim 2, wherein at least one of the antiscatter grid and collimator is bonded to the detector surface.

6. The method as claimed in claim 5, wherein the bonding is carried out sequentially for juxtaposed subareas of the detector surface.

7. The method as claimed in claim 6, wherein, before being applied, at least one of the antiscatter grid and collimator is divided into segments which correspond to the subareas, applied sequentially in an individual fashion.

8. An x-ray detector comprising an array of detector elements and an antiscatter grid with transmission channels and intermediate walls with an absorbing coating, produced and applied by the method claimed in claim 2.

9. A gamma detector comprising an array of detector elements and a collimator with transmission channels and intermediate walls with an absorbing coating, produced and applied by the method claimed in claim 2.

10. The method as claimed in claim 1, wherein a geometry of the basic structure is selected corresponding to the array of the detector elements so as to produce a cellular at least one of an antiscatter grid and collimator in the case of which the arrangement of transmission channels transmissive to at least one of x-radiation and gamma radiation corresponds to the arrangement of the sensitive detection regions.

11. An x-ray detector comprising an array of detector elements and an antiscatter grid with transmission channels and intermediate walls with an absorbing coating, produced and applied by the method claimed in claim 10.

12. A gamma detector comprising an array of detector elements and a collimator with transmission channels and intermediate walls with an absorbing coating, produced and applied by the method claimed in claim 10.

13. The method as claimed in claim 1, wherein the basic structure is produced from a material which is substantially transparent to at least one of x-radiation and gamma radiation, and end faces of the intermediate walls are kept free of the coating with the absorbing material.

14. An x-ray detector comprising an array of detector elements and an antiscatter grid with transmission channels and intermediate walls with an absorbing coating, produced and applied by the method claimed in claim 13.

15. A gamma detector comprising an array of detector elements and a collimator with transmission channels and intermediate walls with an absorbing coating, produced and applied by the method claimed in claim 13.

16. The method as claimed in claim 1, wherein the basic structure is produced from a material which is substantially transparent to at least one of x-radiation and gamma radiation, and the coating with the absorbing material is removed from end faces of the intermediate walls.

17. An x-ray detector comprising an array of detector elements and an antiscatter grid with transmission channels and intermediate walls with an absorbing coating, produced and applied by the method claimed in claim 16.

18. A gamma detector comprising an array of detector elements and a collimator with transmission channels and intermediate walls with an absorbing coating, produced and applied by the method claimed in claim 16.

19. The method as claimed in claim 1, wherein the coating is performed by at least one of sputtering and electrolytic deposition.

20. The method as claimed in claim 1, wherein at least one of the antiscatter grid and collimator is applied to the detector surface and connected to the detector surface in such a way that in each case a corner region of the coating with the absorbing material of a transmission channel is situated over a switching element of a detector element.

21. The method as claimed in claim 1, wherein at least one of the antiscatter grid and collimator is bonded to the detector surface.

22. The method as claimed in claim 21, wherein the bonding is carried out sequentially for juxtaposed subareas of the detector surface.

23. The method as claimed in claim 22, wherein, before being applied, at least one of the antiscatter grid and collimator is divided into segments which correspond to the subareas, applied sequentially in an individual fashion.

24. The method as claimed in claim 1, wherein at least one of the antiscatter grid and collimator is applied to the detector surface with the aid of a flip-chip technique.

25. The method as claimed in claim 24, wherein at least one of the antiscatter grid and collimator is applied to the detector surface with the aid of a holder supporting the basic structure.

26. The method as claimed in claim 1, wherein for bonding purposes an adhesive liquid is sprayed onto at least one of the detector surface, the antiscatter grid and the collimator.

27. The method as claimed in claim 1, wherein, for bonding purposes, a thermally melting adhesive is applied to at least one of the detector surface, the antiscatter grid and the collimator and is briefly melted by a heat source after the application of at least one of the antiscatter grid and collimator to the detector surface.

28. The method as claimed in claim 1, wherein the basic structure is constructed so as to produce a focused at least one of antiscatter grid and collimator.

29. An x-ray detector comprising an array of detector elements and an antiscatter grid with transmission channels and intermediate walls with an absorbing coating, produced and applied by the method claimed in claim 1.

30. A gamma detector comprising an array of detector elements and a collimator with transmission channels and intermediate walls with an absorbing coating, produced and applied by the method claimed in claim 1.

31. A method for producing and applying at least one of an antiscatter grid and collimator to at least one of an x-ray and gamma detector, comprising:
  forming transmission channels and intermediate walls of at least one of the antiscatter grid and collimator through layer-wise solidification using a rapid prototyping technique, including at least in a first direction, a center-to-center spacing at least an integral multiple of a center-to-center spacing of sensitive detection regions of the detector;
  coating the intermediate walls with a material which strongly absorbs at least one of x-radiation and gamma radiation; and
  applying the at least one of the antiscatter grid and collimator to the detector surface and connecting the at least one of the antiscatter grid and collimator to the detector surface in such a way that at least one of the intermediate walls running perpendicular to the first direction and their coating, are situated over relatively less sensitive intermediate regions of the detector surface.

32. The method as claimed in claim 31, wherein a method of stereolithography is used as the rapid prototyping technique.

33. An x-ray detector comprising an array of detector elements and an antiscatter grid with transmission channels and intermediate walls with an absorbing coating, produced and applied by the method claimed in claim 31.

34. A gamma detector comprising an array of detector elements and a collimator with transmission channels and intermediate walls with an absorbing coating, produced and applied by the method claimed in claim 31.

* * * * *